US008298058B2

(12) United States Patent
Lauer

(10) Patent No.: US 8,298,058 B2
(45) Date of Patent: Oct. 30, 2012

(54) ROTOR FOR A STRAW CHOPPER

(75) Inventor: Fritz K. Lauer, Krähenberg (DE)

(73) Assignee: Deere & Company, Moline, IL (US)

( * ) Notice: Subject to any disclaimer, the term of this patent is extended or adjusted under 35 U.S.C. 154(b) by 1165 days.

(21) Appl. No.: 11/235,749

(22) Filed: Sep. 27, 2005

(65) Prior Publication Data
US 2006/0073861 A1 Apr. 6, 2006

(30) Foreign Application Priority Data
Oct. 2, 2004 (DE) .......................... 10 2004 048 115

(51) Int. Cl.
*A01F 12/00* (2006.01)

(52) U.S. Cl. ............................ 460/122; 460/112; 56/294

(58) Field of Classification Search .................. 460/111, 460/112, 121, 122, 135; 56/294, 504
See application file for complete search history.

(56) References Cited

U.S. PATENT DOCUMENTS

| 3,103,241 | A | | 10/1963 | Weigel ........................... 146/107 |
| 3,574,989 | A | * | 4/1971 | Rousseau et al. .............. 56/10.7 |
| 3,678,671 | A | * | 7/1972 | Scarnato et al. ................ 56/505 |
| 3,717,062 | A | | 2/1973 | Gaeddert ....................... 146/107 |
| 5,101,583 | A | * | 4/1992 | Scordilis ........................... 37/91 |
| 5,232,405 | A | | 8/1993 | Redekop et al. .............. 460/112 |
| 5,482,508 | A | * | 1/1996 | Redekop et al. .............. 460/112 |
| 6,511,374 | B2 | * | 1/2003 | VanEe ............................ 460/112 |
| 6,692,351 | B2 | * | 2/2004 | Johnson et al. ............... 460/112 |
| 6,829,879 | B2 | * | 12/2004 | Weichholdt .................... 56/504 |
| 7,104,883 | B2 | * | 9/2006 | Dow .............................. 460/112 |

FOREIGN PATENT DOCUMENTS

| DE | 3631485 | 3/1988 |
| DE | 3925701 | 8/1989 |
| DE | 3925701 | 2/1991 |
| DE | 39 25 701 C2 | 3/1997 |
| DE | 19749338 | 5/1999 |
| DE | 10107776 | 2/2001 |
| EP | 12 032 683 A1 | 8/2002 |

OTHER PUBLICATIONS

German Search Report dated Feb. 9, 2007 (4 pages).

* cited by examiner

*Primary Examiner* — Jamie L McGowan
(74) *Attorney, Agent, or Firm* — Taylor IP, P.C.

(57) ABSTRACT

A rotor for a straw chopper includes a rotor body, a mount disposed on the rotor body, at least one copper blade suspended, detachably, in a swinging fashion on the mount with a fastening element, and a fan blade element detachably connected to the mount by way of the fastening element. The fan blade element is attached in a rigid manner to the rotor body.

12 Claims, 3 Drawing Sheets

ROTOR FOR A STRAW CHOPPER

FIELD OF THE INVENTION

The invention relates to a rotor for a straw chopper of a combine harvester.

BACKGROUND OF THE INVENTION

Straw choppers on combine harvesters are typically equipped with a rotor having chopper blades suspended in a swinging fashion. The blades rotate at a high speed and enter into clearances defined by stationary counter-blades. The conveyed and chopped material, which may be straw or chaff or a mixture thereof, is conveyed, after being cut through the rotating chopper blades, from the housing of the straw chopper. It then meets with guiding plates disposed downstream from the straw chopper, which deflect the material laterally, allowing it to be distributed across the largest possible part of the cutting width of the combine.

Combine harvesters are presently equipped with ever increasing cutting widths, which make it more and more difficult to spread the material across the cutting width of the combine harvester using such a chopper rotor.

Several suggestions have been made to increase the spreading distance by generating an airflow in that the chopper blades proper are equipped with surfaces for the purpose of creating an airflow that pulls the chopped material with it. The prior art discloses blades attached rigidly to the rotor with plates extending at the rear in the direction of an axis of the rotor (U.S. Pat. No. 3,103,241 A), blades suspended in a swinging fashion (U.S. Pat. No. 3,717,062 A; U.S. Pat. No. 5,232,405 A; and U.S. Pat. No. 5,482,508 A), torqued, swinging blades (U.S. Pat. No. 6,511,374 B), plate-shaped blades extending in the direction of the axis of the rotor and being rigidly connected there (German Patent No. DE 197 49 338 A) as well as U-shaped blades suspended in a swinging fashion including a leg extending in the direction of the axis of the rotor (DE 101 07 776 A) have been suggested. One disadvantage of chopper blades having fan blade surfaces attached thereto or integrated on them (U.S. Pat. No. 3,103,241 A; U.S. Pat. No. 3,717,062 A; U.S. Pat. No. 5,232,405 A; U.S. Pat. No. 5,482,508 A; and DE 101 07 776 A) is that they cannot be inversed after their cutting edges have worn because the surfaces serving the creation of the airflow would come to the leading side, which does not lend itself to a satisfactory cutting behavior. The blades, according to U.S. Pat. No. 6,511, 374 B, are expensive to manufacture, and those, according to DE 197 49 338 A, require a high driving power. Therefore it would be desirable to maintain the familiar flat chopper blades and utilize other surfaces for providing airflow.

DE 39 25 701 C describes a straw chopper, where in the space between adjoining chopper blades a fan blade is seated freely pivoting on a fastener that is firmly connected to the chopper shaft. The swinging seat allows a straw guiding flap to be brought into such a position that the chopper is covered during a windrowing operation. However, it also has a disadvantage in that the fan blade, during operation, evades the air pressure and hence has only little effect.

Finally, straw choppers have been equipped with relatively wide fasteners for the chopper blades (U.S. Pat. No. 3,717, 062 A, U.S. Pat. No. 6,692,351 B). These may unfold a certain fan blade effect, however they are welded to the rotor and are difficult to replace when they become damaged. Moreover they cannot be disassembled when only a narrow range of the straw chopper is desired for special applications.

What is needed in the art is a combine with a straw chopper, that avoids the aforementioned drawbacks.

SUMMARY OF THE INVENTION

The invention provides a chopper rotor which enables a satisfactory range of the chopped crop through suitable fan blade elements and in which the fan blade elements are easily replaced or removed if needed.

One embodiment of the present invention includes a rotor of a straw chopper having a cylindrical rotor body, which, during operation, is offset about its longitudinal axis of rotation. On the rotor body a plurality of mounts are disposed, that fasten chopper blades that are suspended in a swinging fashion. The chopper blades are equipped with cutting edges on their leading and generally also on their trailing edges and preferably run between stationary counter-blades so as to chop the material. The chopper blades are detachably attached to the mount by way of fastening elements. The fastening elements also serve to detachably fasten a fan blade element to the mount. The fan blade element is attached not in a swinging manner, but rigidly to the rotor.

In this way good airflow and a wide range of distribution of chopped matte, by the straw chopper, are achieved since the fan blade element cannot evade the air pressure. It is easy and quick to disassemble when it is not needed or to replace when it is worn.

The surface of the fan blade element faces the rotor such that it complements the shape of the rotor, such as, a substantially concave shape, in order to achieve the rigid fastening of the fan blade element to the rotor by way of a positive fit. Alternatively, or additionally, the fastening element may be connected non-rotatably to the mount, and the fan blade element may likewise be connected non-rotatably to the fastening element. For this a slotted screw may be used, in the slot of which protruding elements of the mount and the fan blade element engage.

In many applications it is useful to attach a fan blade element on either side of a mount. In order to reduce the number of different parts to be manufactured and stored, it has proven useful to configure the fan blade element to be axially symmetrical. A fan blade element may hence be rotated by 180° and be attached on the other side of the mount. When they become worn, the fan blade elements, which wear presumably on the leading surface, may be swapped on either side of the mount. The fan blade element is U-shaped, with the center leg interacting with the fastening element.

All of some of the mounts of a rotor may be equipped with the fan blade elements, according to the present invention, as a function of the desired fan blade effect. If the mounts are disposed in several rows, it would be possible to equip only part of the rows with the fan blade elements. It may also prove useful to equip only outer mounts with fan blade elements since there the conveyed material must be spread especially far to the side, while the inner mounts do not require any fan blade elements since the material proximate to the inner mounts is not supposed to be transported far to the side for spreading. This way energy may be saved for driving the rotor.

BRIEF DESCRIPTION OF THE DRAWINGS

The drawings illustrate an exemplary embodiment of the invention, which is described in more detail hereinafter, wherein.

DETAILED DESCRIPTION OF THE INVENTION

Figure 1:
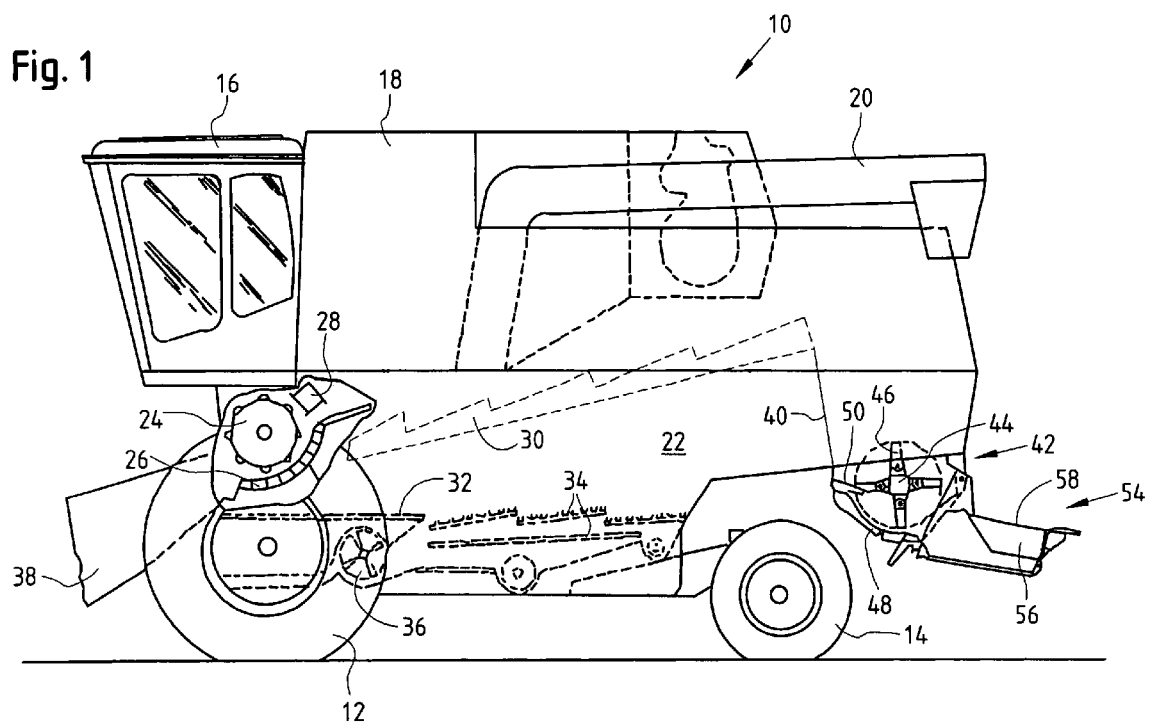
FIG. 1 illustrates a combine harvester including an embodiment of a straw chopper of the present invention.

Referring now to the drawings, and more particularly to FIG. 1 there is shown a harvesting machine in the form of a combine harvester 10 carried on front driven wheels 12 and rear steerable wheels 14 and includes a driver's cab 16, from where a driver may operate it. To the rear of driver's cab 16 a grain tank 18 is connected, which may discharge crop fed to it, to the outside by way of a discharge pipe 20. Grain tank 18 is seated on a frame 22. Harvested crop is fed through threshing cylinder 24, a concave 26 and a turning drum 28 and is separated into its larger and smaller components. On subsequent shakers 30 as well as on a processing floor 32 and sieves 34 the harvested crop is separated further, wherein finally the threshed good portion is conveyed into grain tank 18. The large crop parts are conveyed across shakers 30 via a straw guiding plate 40 to a straw chopper 42. Light-weight components are blown from sieves 34 on the floor or into the inlet of straw chopper 42 by way of a blower 36 or transported there by way of a separate conveyor. Crop located on the floor is fed to threshing cylinder 24 by way of a feeder house 38. The crop passes by a rock trap after it has been picked up from the floor by a crop pick-up device, which is not shown.

Straw chopper 42 includes a housing 48 and a rotor disposed therein, which has a hollow, cylindrical rotor body 44 and chopper blades 46, which are suspended in a swinging fashion and distributed across its circumference and its length. Rotor body 44 is connected with a drive such that it rotates in housing 48 about a substantially horizontal axis running transversely to the travel direction of combine 10. The threshed, large crop parts are shredded into chopped crop through interaction with counter-blades 50. At the back of straw chopper 42 a distributing device 54 is disposed having a plurality of straw guiding plates 56 arranged laterally next to each other, which are disposed beneath a spreader hood 58.

Figure 2:
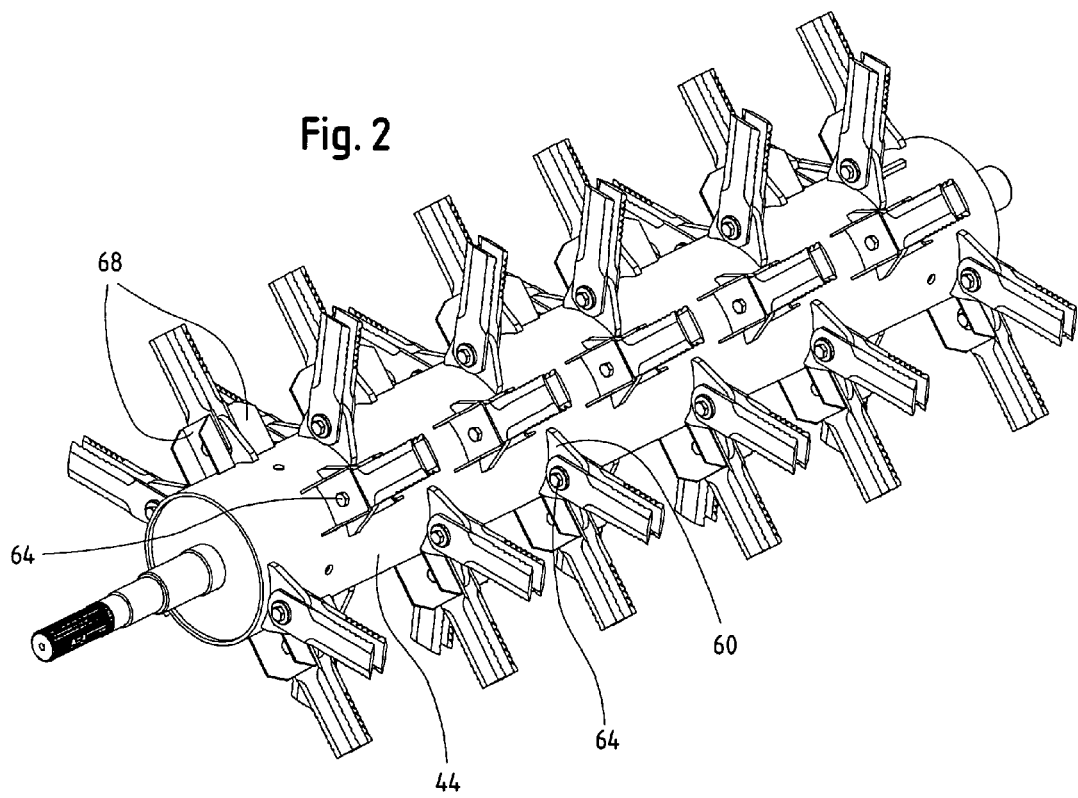
FIG. 2 is a perspective view of the rotor of the straw chopper of FIG. 1 with fan blade elements.

Now, additionally referring to FIG. 2, the rotor with rotor body 44 and chopper blades 46 attached thereto is shown in a perspective illustration. Eight rows of mounts extending in the axial direction of rotor body 44, which are welded onto rotor body 44. The mounts are equipped with bores 62 extending in the axial direction of rotor body 44 (now additionally see FIG. 3). A fastening element 64, in the form of a bolt 64, which is secured by a nut 66, is located in each of bores 62.

On mounts 60 of every other row fastening element 64 serves to also attach fan blade elements 68 on either side of mounts 60. Fastening element 64 extends through corresponding holes 70 in fan blade elements 68.

Fan blade elements 68 have a U-shaped cross-section and hence have three legs. Hole 70 is located in the center leg so that the remaining legs extend in an axial direction of rotor body 44. The outer edges of the other legs are tapered slightly proceeding from the center leg to the outer end. The surface of the center leg of fan blade element 68 resting against rotor body 44 is rounded, resulting in only a small or no gap between fan blade elements 68 and rotor body 44. In this way fan blade elements 68 are attached rigidly, not in a swinging fashion, to rotor body 44. Fan blade elements 68 on either side of mount 60 are symmetrical relative to the longitudinal axis of rotor body 44 and they are identical among each other so that only one type of fan blade elements 68 needs to be manufactured and they may be replaced without concern as to their orientation.

The length of fan blade elements 68 is less than that of chopper blades 46 so that the latter may enter between counter-blades 50. Fan blade elements 68 therefore do not interact with the chopped material, but instead only transport air. Due to their rigid arrangement, the air conveying effect is greater than in the case of fan blade elements with a swinging suspension.

Figure 3:
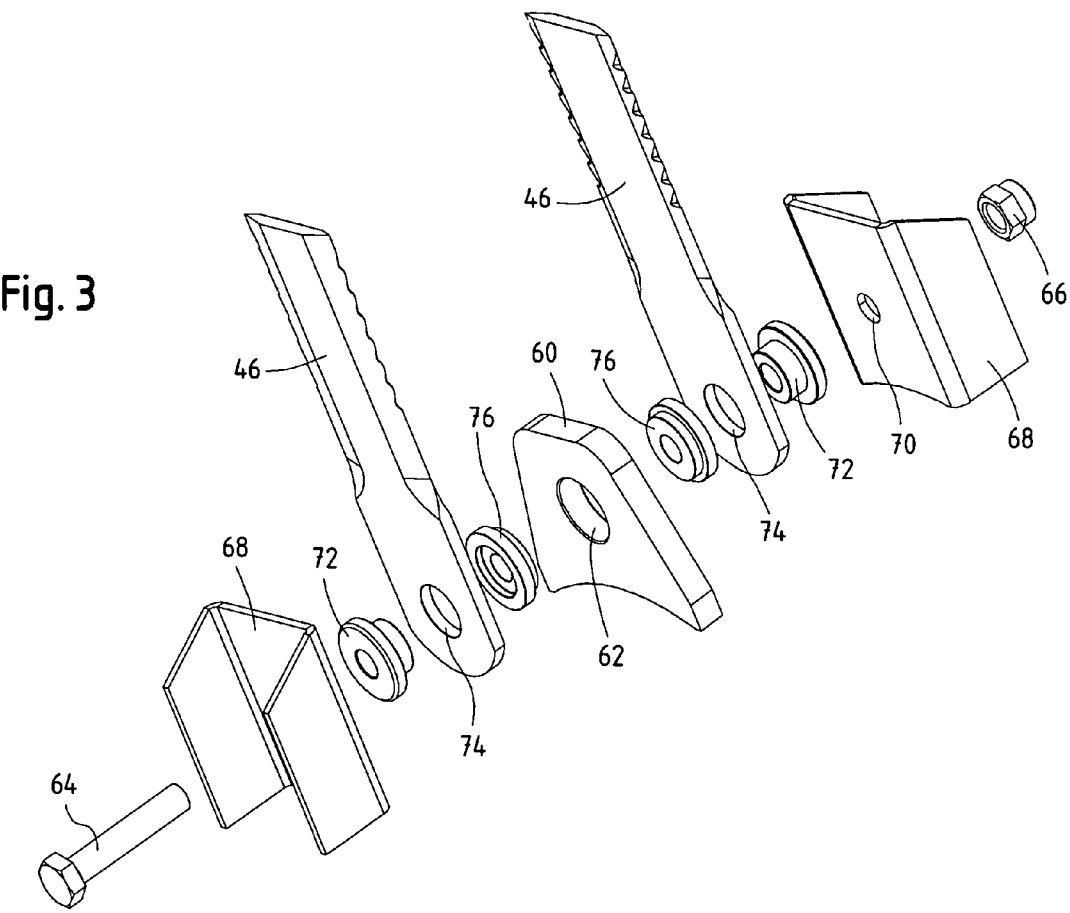
FIG. 3 is a perspective exploded view of the fan blade elements and the chopper blades on the mount of the rotor of the straw chopper of FIGS. 1 and 2.

As already mentioned and illustrated in FIG. 3, fan blade elements 68 and chopper blades 46 are attached by way of fastening elements 64 in the form of screws 64, which extend through a hole in a fan blade element 68, a first bushing 72, a hole 74 in chopper blade 46, a second bushing 76, bore 62 in mount 60, another second bushing 76, a hole 74 in a second chopper blade 46, another first bushing 72, a hole 70 in another fan blade element 68 and finally nut 66. Bushings 72 extend in hole 74 in chopper blade 46, leaving sufficient clearance for the swinging seat of chopper blade 46. Bushings 76 extend into bore 62. All elements illustrated in FIG. 3, with the exception of fan blade elements 68, are already used in existing straw choppers; only fastening element 64 is several millimeters longer. In this way fan blade elements 68 may be retrofitted on existing combine harvesters 10 without difficulty.

Having described the preferred embodiment, it will become apparent that various modifications can be made without departing from the scope of the invention as defined in the accompanying claims.

The invention claimed is:

1. A rotor for a straw chopper in an agricultural harvester, said rotor comprising:
    a rotor body;
    a mount disposed on said rotor body;
    a fastening element;
    at least one chopper blade suspended detachably and in a swinging fashion on said mount by said fastening element; and
    a fan blade element connected detachably to said mount by way of said fastening element, said fan blade element being rigidly attached to said rotor body, said fastening element extending through said mount, said at least one chopper blade and said fan blade element, said fan blade element resting against said rotor body, said fan blade element not being directly attached to said rotor body.

2. The rotor of claim 1, wherein said fan blade element is rigidly connected to said rotor body by way of a positive fit.

3. The rotor of claim 1, wherein said fan blade element has a U-shaped cross-section normal to the rotational axis of the said rotor body.

4. A rotor for a straw chopper in an agricultural harvester, said rotor comprising:
    a rotor body;
    a mount disposed on said rotor body;
    a fastening element;
    at least one chopper blade suspended detachably and in a swinging fashion on said mount by said fastening element;
    a fan blade element connected detachably to said mount by way of said fastening element, said fan blade element being rigidly attached to said rotor body; and
    an other fan blade element, said fan blade element and said other fan blade element each being substantially identical and axially symmetrical so that said fan blade element and said other fan blade element are arranged on either side of said mount and may be replaced with each other, said fastening element extending through said mount, said at least one chopper blade and said fan blade element, said fan blade element resting against said rotor body, said fan blade element not being directly attached to said rotor body.

5. A rotor for a straw chopper in an agricultural harvester, said rotor comprising:
   a rotor body;
   a mount disposed on said rotor body;
   a fastening element;
   at least one chopper blade suspended detachably and in a swinging fashion on said mount by said fastening element; and
   a fan blade element connected detachably to said mount by way of said fastening element, said fan blade element being rigidly attached to said rotor body, said fan blade element having a U-shaped cross-section, said fan blade element includes a center leg that interacts with said fastening element, said fastening element extending through said mount, said at least one chopper blade and said fan blade element, said fan blade element resting against said rotor body, said fan blade element not being directly attached to said rotor body.

6. A rotor for a straw chopper in an agricultural harvester, said rotor comprising:
   a rotor body;
   a mount disposed on said rotor body;
   a fastening element;
   at least one chopper blade suspended detachably and in a swinging fashion on said mount by said fastening element;
   a fan blade element connected detachably to said mount by way of said fastening element, said fan blade element being rigidly attached to said rotor body;
   a plurality of mounts similar to said mount, said plurality of mounts disposed on said rotor body; and
   a plurality of fan blade elements substantially similar to said fan blade element, a portion of said plurality of mounts not having any of said fan blade elements associated therewith and an other portion of said plurality of mounts having at least one of said plurality of fan blade elements respectively associated therewith, said fastening element extending through said mount, said at least one chopper blade and said fan blade element, said fan blade element resting against said rotor body, said fan blade element not being directly attached to said rotor body.

7. A combine harvester, comprising:
   a straw chopper including a rotor having:
      a rotor body;
      a mount disposed on said rotor body;
      a fastening element;
      at least one chopper blade suspended detachably and in a swinging fashion on said mount by said fastening element; and
      a fan blade element connected detachably to said mount by way of said fastening element, said fan blade element being rigidly attached to said rotor body, said fastening element extending through said mount, said at least one chopper blade and said fan blade element, said fan blade element resting against said rotor body, said fan blade element not being directly attached to said rotor body.

8. The combine harvester of claim 7, wherein said fan blade element is rigidly connected to said rotor body by way of a positive fit.

9. The combine harvester of claim 7, wherein said fan blade element has a U-shaped cross-section normal to the rotational axis of the said rotor body.

10. A combine harvester, comprising
    a straw chopper including a rotor having:
       a rotor body;
       a mount disposed on said rotor body;
       a fastening element;
       at least one chopper blade suspended detachably and in a swinging fashion on said mount by said fastening element;
       a fan blade element connected detachably to said mount by way of said fastening element, said fan blade element being rigidly attached to said rotor body; and
       an other fan blade element, said fan blade element and said other fan blade element each being substantially identical and axially symmetrical so that said fan blade element and said other fan blade element are arranged on either side of said mount and may be replaced with each other, said fastening element extending through said mount, said at least one chopper blade and said fan blade element, said fan blade element resting against said rotor body, said fan blade element not being directly attached to said rotor body.

11. A combine harvester, comprising:
    a straw chopper including a rotor having:
       a rotor body;
       a mount disposed on said rotor body;
       a fastening element;
       at least one chopper blade suspended detachably and in a swinging fashion on said mount by said fastening element; and
       a fan blade element connected detachably to said mount by way of said fastening element, said fan blade element being rigidly attached to said rotor body; said fan blade element having a U-shaped cross-section, said fan blade element includes a center leg that interacts with said fastening element, said fastening element extending through said mount, said at least one chopper blade and said fan blade element, said fan blade element resting against said rotor body, said fan blade element not being directly attached to said rotor body.

12. A combine harvester, comprising
    a straw chopper including a rotor having:
       a rotor body;
       a mount disposed on said rotor body;
       a fastening element;
       at least one chopper blade suspended detachably and in a swinging fashion on said mount by said fastening element;
       a fan blade element connected detachably to said mount by way of said fastening element, said fan blade element being rigidly attached to said rotor body;
       a plurality of mounts similar to said mount, said plurality of mounts disposed on said rotor body; and
    a plurality of fan blade elements substantially similar to said fan blade element, a portion of said plurality of mounts not having any of said fan blade elements associated therewith and an other portion of said plurality of mounts having at least one of said plurality of fan blade elements respectively associated therewith, said fastening element extending through said mount, said at least one chopper blade and said fan blade element, said fan blade element resting against said rotor body, said fan blade element not being directly attached to said rotor body.

* * * * *